US011862123B1

(12) United States Patent
Zhu et al.

(10) Patent No.: US 11,862,123 B1
(45) Date of Patent: Jan. 2, 2024

(54) DISPLAY DRIVING METHOD AND DEVICE, LIQUID CRYSTAL CONTROLLER, DISPLAY SYSTEM AND PROJECTION DEVICE

(71) Applicant: SHENZHEN KEJINMING ELECTRONIC CO., LTD, Guangdong (CN)

(72) Inventors: Xianxiong Zhu, Guangdong (CN); Chunrong Fan, Guangdong (CN); Degang Lei, Guangdong (CN)

(73) Assignee: SHENZHEN KEJINMING ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 18/241,429

(22) Filed: Sep. 1, 2023

(30) Foreign Application Priority Data

Sep. 30, 2022 (CN) ......................... 202211214910.0

(51) Int. Cl.
*G09G 3/36* (2006.01)
*G09G 3/00* (2006.01)

(52) U.S. Cl.
CPC ........... *G09G 3/3674* (2013.01); *G09G 3/002* (2013.01); *G09G 3/3655* (2013.01); *G09G 2300/0452* (2013.01); *G09G 2300/0478* (2013.01); *G09G 2340/08* (2013.01)

(58) Field of Classification Search
CPC ...................................................... G09G 3/002
See application file for complete search history.

(56) References Cited

FOREIGN PATENT DOCUMENTS

| | | | |
|---|---|---|---|
| CN | 1971353 | A | 5/2007 |
| CN | 102750922 | A | 10/2012 |
| CN | 103093722 | A | 5/2013 |
| CN | 103220478 | A | 7/2013 |
| CN | 103956144 | A | 7/2014 |
| CN | 105575353 | A | 5/2016 |
| CN | 111128068 | A | 5/2020 |
| CN | 113470588 | A | 10/2021 |
| CN | 114550671 | A | 5/2022 |

(Continued)

OTHER PUBLICATIONS

Notice of Allowance of counterpart Chinese Patent Application No. 202211214910.0 dated Aug. 7, 2023.

(Continued)

*Primary Examiner* — Gustavo Polo

(57) ABSTRACT

Provided are a display driving method and device, liquid crystal controller, display system and projection device. The method comprises: acquiring driving configuration information of the liquid crystal module, the driving configuration information is used for indicating the number of configured LCD drivers; receiving a color image frame, and decomposing the color image frame into 3 monochrome frame images; performing segmentation processing on each monochrome frame image to obtain monochrome frame segmentation image data corresponding to each display area of the liquid crystal module; packaging the monochrome frame segmentation image data corresponding to each display area, and sending data to the LCD driver corresponding to each display area; after the LCD driver receives the monochrome frame segmentation image data, writing, by the LCD driver the received monochrome frame segmentation image data into the liquid crystal module to drive the display area corresponding to the liquid crystal module to display.

9 Claims, 7 Drawing Sheets

(56) References Cited

FOREIGN PATENT DOCUMENTS

| | | | |
|---|---|---|---|
| CN | 114743514 | A | 7/2022 |
| JP | 2020500326 | A | 1/2020 |
| KR | 20000033839 | A | 6/2000 |

OTHER PUBLICATIONS

1st Office Action of counterpart Chinese Patent Application No. 202211214910.0 dated May 26, 2023.

DISPLAY DRIVING METHOD AND DEVICE, LIQUID CRYSTAL CONTROLLER, DISPLAY SYSTEM AND PROJECTION DEVICE

CROSS REFERENCE TO RELATED APPLICATIONS

The present application claims the benefit of Chinese Patent Application No. 202211214910.0 filed on Sep. 30, 2022, the contents of which are incorporated herein by reference in their entirety.

TECHNICAL FIELD

The application relates to the technical field of liquid crystal display, in particular to a display driving method and device, liquid crystal controller, display system and projection device.

BACKGROUND

Usually, an LCD driver and a liquid crystal controller are used to drive the display of a liquid crystal display (LCD). In the traditional display driving solution, under the control of the liquid crystal controller, the same LCD driver is used to write color data to each pixel in the complete liquid crystal display area. The inventor found that because the LCD driver writes color data line by line, it is time-consuming for each frame, and the fixed LCD flip time will make it difficult to improve the display refresh rate, especially in the case of large images. Therefore, the traditional LCD driving method is difficult to improve the display refresh rate.

SUMMARY

The application relates to the technical field of display driving, and discloses a display driving method and device, a liquid crystal controller, a display system and a projection device, aiming to solve the technical problem that the traditional solution is difficult to improve the display refresh rate.

In order to solve the above technical problems, the following technical solutions are provided:

A display driving method, used for a display system, the display system includes a liquid crystal controller, a liquid crystal module and a plurality of LCD drivers, and the display driving method includes the following steps:

acquiring, by the liquid crystal controller, driving configuration information of the liquid crystal module, the driving configuration information is used for indicating the number of configured LCD drivers;

receiving, by the liquid crystal controller, a color image frame, and decomposing the color image frame into 3 monochrome frame images;

performing, by the liquid crystal controller, segmentation processing on each monochrome frame image according to the driving configuration information to obtain monochrome frame segmentation image data corresponding to each display area of the liquid crystal module;

packaging, by the liquid crystal controller, the monochrome frame segmentation image data corresponding to each display area, and sending data to the LCD driver corresponding to each display area; when the liquid crystal controller starts to output each monochrome frame, a monochrome frame color indication signal is simultaneously output to a backlight module to indicate a current output color frame;

after the LCD driver receives the monochrome frame segmentation image data, writing, according to display control information of the corresponding display area and the received monochrome frame segmentation image data, by the LCD driver, the received monochrome frame segmentation image data into the liquid crystal module to drive the display area corresponding to the liquid crystal module to display, and meanwhile after writing a line, outputting a synchronization signal to instruct the corresponding backlight module to start synchronously controlling a backlight delay circuit action; and packaging, by the liquid crystal controller, data; in each line of signal of the monochrome frame segmentation image data of the corresponding LCD driver, 3 consecutive pixel points are taken as one RGB protocol point in a standard color protocol; if the number of pixel points of a current line in the display area is not a multiple of 3, then it is filled with "0", until it is enough to form a full protocol point; and connecting, by the LCD driver, circuit of a pixel point with 3 colors to three adjacent monochrome points of the liquid crystal module.

Optionally, the number of the display areas corresponding to the liquid crystal module matches the number of the LCD drivers, and each of the LCD drivers is used to drive one of the display areas correspondingly, and the display areas driven by the LCD drivers are different.

Optionally, the display driving method includes: sequentially allocating, by the liquid crystal controller, a corresponding driving line as display area for each of the LCD drivers at certain line intervals, and each LCD driver is used for driving the allocated driving line.

Optionally, the display driving method includes: decomposing, by the LCD driver, one pixel point with 3 colors in the monochrome frame segmentation image data, and connecting them to three adjacent monochrome points in the same line.

Optionally, the step of performing, by the liquid crystal controller, segmentation processing on each monochrome frame image according to the driving configuration information to obtain monochrome frame segmentation image data corresponding to each display area of the liquid crystal module, including:

determining, by the liquid crystal controller, the number of the display areas and display resolution according to the driving configuration information; and performing, by the liquid crystal controller, segmentation processing on each monochrome frame image according to the number of the display areas and the display resolution, to obtain monochrome frame segmentation image data corresponding to each display area of the liquid crystal module.

A display driving device, including:

an acquisition module, configured to acquire driving configuration information of a liquid crystal module, and receive a color image frame, the driving configuration information is used for indicating the number of configured LCD drivers;

a processing module, configured to decompose the color image frame into 3 monochrome frame images; and perform segmentation processing on each monochrome frame image according to the driving configuration information to obtain monochrome frame segmentation image data corresponding to each display area of the liquid crystal module; when each monochrome frame is output, a monochrome frame color indication signal is simultaneously output to a backlight module to indicate a current output color frame;

package the monochrome frame segmentation image data corresponding to each display area, and send data to the LCD driver corresponding to each display area, so that after the LCD driver receives each monochrome frame segmentation image data; according to display control information of the corresponding display area and the received monochrome frame segmentation image data, the LCD driver writes the received monochrome frame segmentation image data into the liquid crystal module to drive the display area corresponding to the liquid crystal module to display, and meanwhile after writing a line, output a synchronization signal to instruct the corresponding backlight module to start synchronously controlling a backlight delay circuit action; and the liquid crystal controller packages data, in each line of signal of the monochrome frame segmentation image data of the corresponding LCD driver, 3 consecutive pixel points are taken as one RGB protocol point in a standard color protocol; if the number of pixel points of a current line in the display area is not a multiple of 3, then it is filled with "0", until it is enough to form a full protocol point.

A liquid crystal controller, used for:

acquiring driving configuration information of the liquid crystal module, the driving configuration information is used for indicating the number of configured LCD drivers;

receiving a color image frame and decomposing the color image frame into three monochrome frame images;

performing segmentation processing on each monochrome frame image according to the driving configuration information to obtain monochrome frame segmentation image data corresponding to each display area of the liquid crystal module;

when the liquid crystal controller starts to output each monochrome frame, a monochrome frame color indication signal is simultaneously output to a backlight module to indicate a current output color frame; packaging the monochrome frame segmentation image data corresponding to each display area, and sending data to the LCD driver corresponding to each display area, so that after the LCD driver receives each monochrome frame segmentation image data; according to display control information of the corresponding display area and the received monochrome frame segmentation image data, the LCD driver writes the received monochrome frame segmentation image data into the liquid crystal module to drive the display area corresponding to the liquid crystal module to display, and meanwhile after writing a line, outputting a synchronization signal to instruct the corresponding backlight module to start synchronously controlling a backlight delay circuit action; and packaging, by the liquid crystal controller, data; in each line of signal of the monochrome frame segmentation image data of the corresponding LCD driver, 3 consecutive pixel points are taken as one RGB protocol point in a standard color protocol; if the number of pixel points of a current line in the display area is not a multiple of 3, then it is filled with "0", until it is enough to form a full protocol point.

A display system, including a liquid crystal controller, a liquid crystal module and a plurality of LCD drivers, wherein the liquid crystal controller is connected with the plurality of LCD drivers, each of the LCD drivers is connected with the liquid crystal module, and the liquid crystal controller is used for realizing the display driving method described above.

A projection device, including the aforementioned display system.

Compared with the traditional means, the solutions provided by the present application bring new beneficial effects. Because the image input to the liquid crystal controller is decomposed, segmented and packaged and sent to each LCD driver, and a plurality of different LCD drivers are controlled according to the segmentation image, and the display area of the liquid crystal module is driven in parallel to display 3 set of monochrome frame segmentation image data, the display refresh rate can be greatly improved. Moreover, because a plurality of LCD drivers are provided, in the embodiments of the application, each monochrome frame image of the liquid crystal module can be segmented flexibly according to the expected number of sets, so that the number of LCD drivers configured for driving can also be flexibly determined. Thereby, the display refresh rate of the image displayed by the liquid crystal module can be flexibly configured or conveniently altered, which is highly practical.

BRIEF DESCRIPTION OF THE DRAWINGS

In order to explain the technical solution of the embodiments of this application more clearly, the drawings described in the description of the embodiments of this application will be briefly introduced below. Obviously, the drawings in the present application and their accompanying detailed description are directed to merely exemplary embodiments of the application. For those of ordinary skill in this field, other drawings may be obtained according to these drawings without any creative effort.

DETAILED DESCRIPTION OF PREFERRED EMBODIMENTS

The technical solutions in the embodiments of the present application will be clearly and completely described below with reference to the drawings in the embodiments of this application. Obviously, the described embodiments are part of the embodiments of this application, but not all of them. Based on the embodiments in this application, all other embodiments obtained by those of ordinary skill in the art without creative effort belong to the protection scope of this application.

Figure 1:
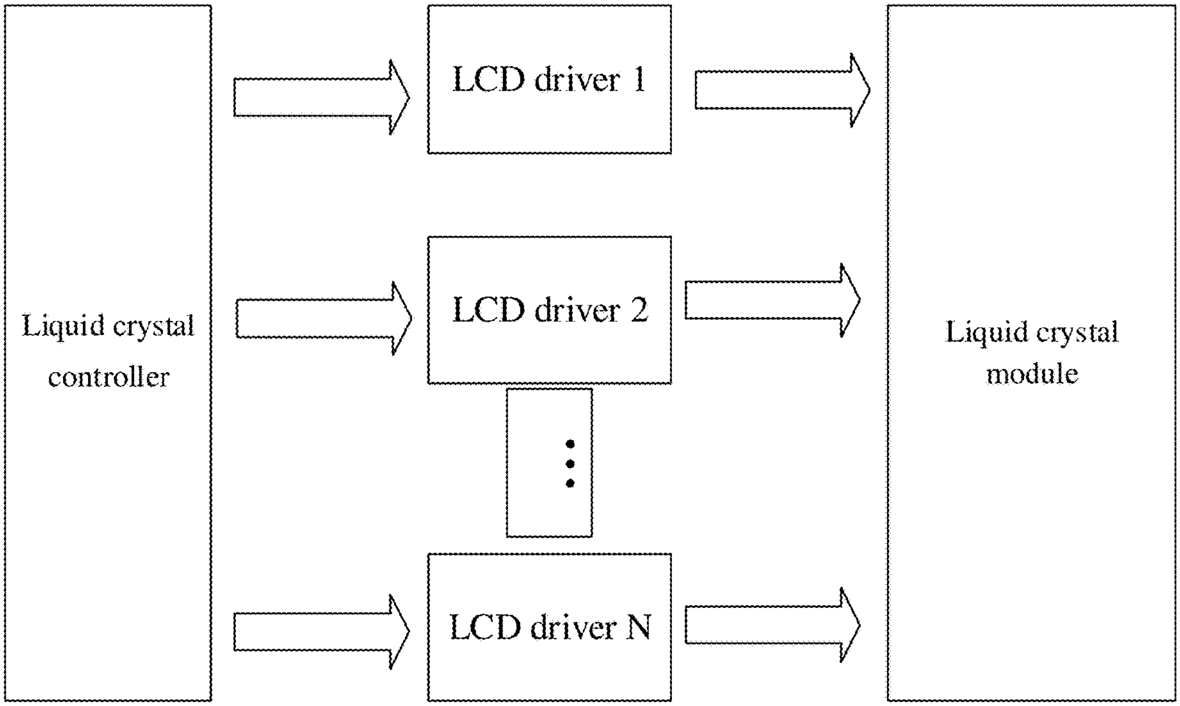
FIG. 1 is a schematic diagram of a system framework of a display system according to an embodiment of the present application.

The application provides a display driving method, which is used in the display system environment shown in FIG. 1. As shown, the display system includes a liquid crystal controller, a liquid crystal module and a plurality of LCD drivers, the liquid crystal controller is electrically connected with the plurality of LCD drivers, and each of the LCD drivers is connected with the liquid crystal module.

Figure 10:
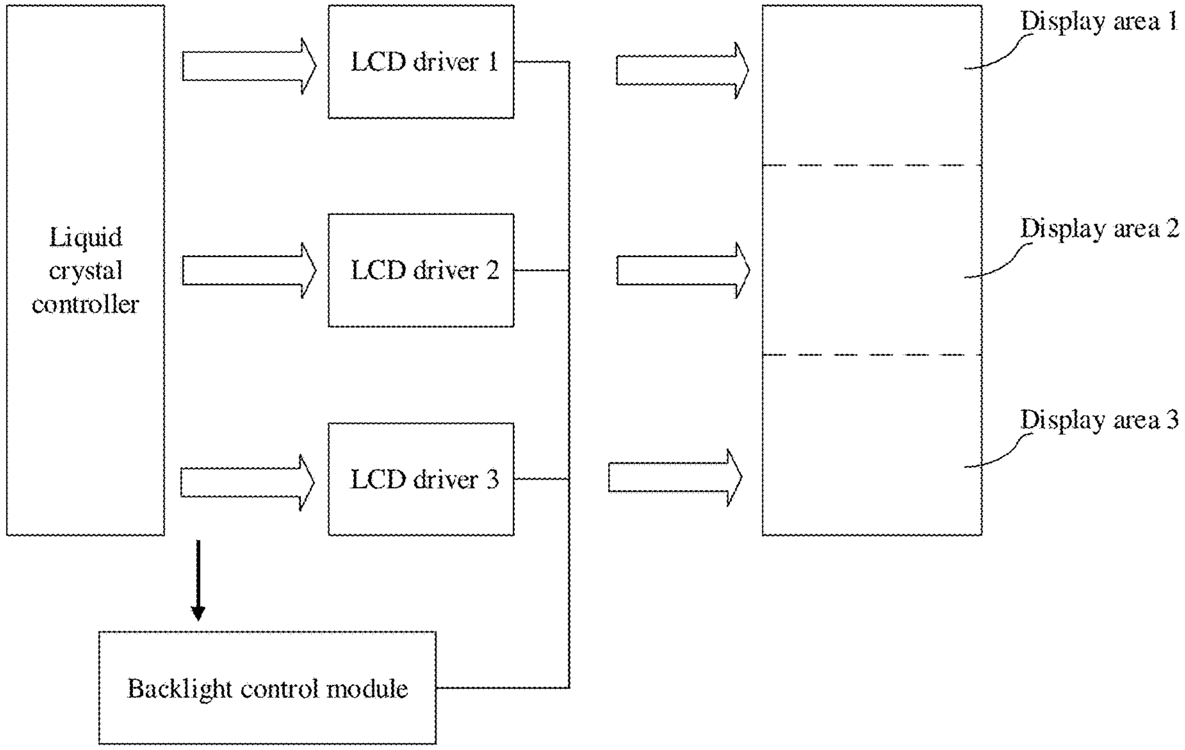
FIG. 10 is a schematic diagram of an embodiment, illustrating that the timing of backlight monochromatic lights is controlled to cooperate with high refresh rate display.

Illustratively, the number of LCD drivers in FIG. 1 is N, and N is at least one (it is worth noting that in the case of color screen, at least two LCD drivers are needed to speed up the writing time if it is expected to continue to improve the display refresh rate). Since the monochrome screen can display 3 colors of red, green and blue in time division, if the writing time and flipping time of the screen itself are sufficient, the correct backlight illumination time of each monochrome may exceed 50% by changing the time sequence of the monochrome backlight in the way shown in FIG. 10, and it can be displayed at a minimum refresh rate of 60 Hz, hence no more LCD drivers are needed. For example, the number of the LCD drivers may be 3, 4 or 5, and may be determined according to requirements. In some application scenarios, specifically, the number of the LCD drivers may be comprehensively considered according to the requirements of hardware cost and/or desired refresh rate, and is not specifically limited.

It should be noted that the above-mentioned multiple LCD drivers may be integrated in the liquid crystal module or arranged separately from the liquid crystal module, and there is no specific limitation. Specifically, the above-mentioned LCD driver may simply be a liquid crystal driving chip (liquid crystal driving IC), i.e., the display system may adopt a plurality of liquid crystal driving chips to drive the liquid crystal module to realize display, and the details are not limited. The liquid crystal module refers to a module with a liquid crystal display screen, and the liquid crystal module may also include other structural modules or be a complete liquid crystal module, which is not detailed here.

In addition, it should be noted that the display system provided by the embodiment of this application may have various application scenarios. For example, this display system may be applied to projection devices, including single-chip LCD projection devices and 3-chip LCD projection devices, and may also be applied to other general display devices. As long as it is an electronic device with a liquid crystal module, it is applicable, and it is not limited in this application. The above-mentioned liquid crystal controller may be a Field Programmable Gate Array (FPGA) or other types of controllers, and it is not limited here.

Figure 2:
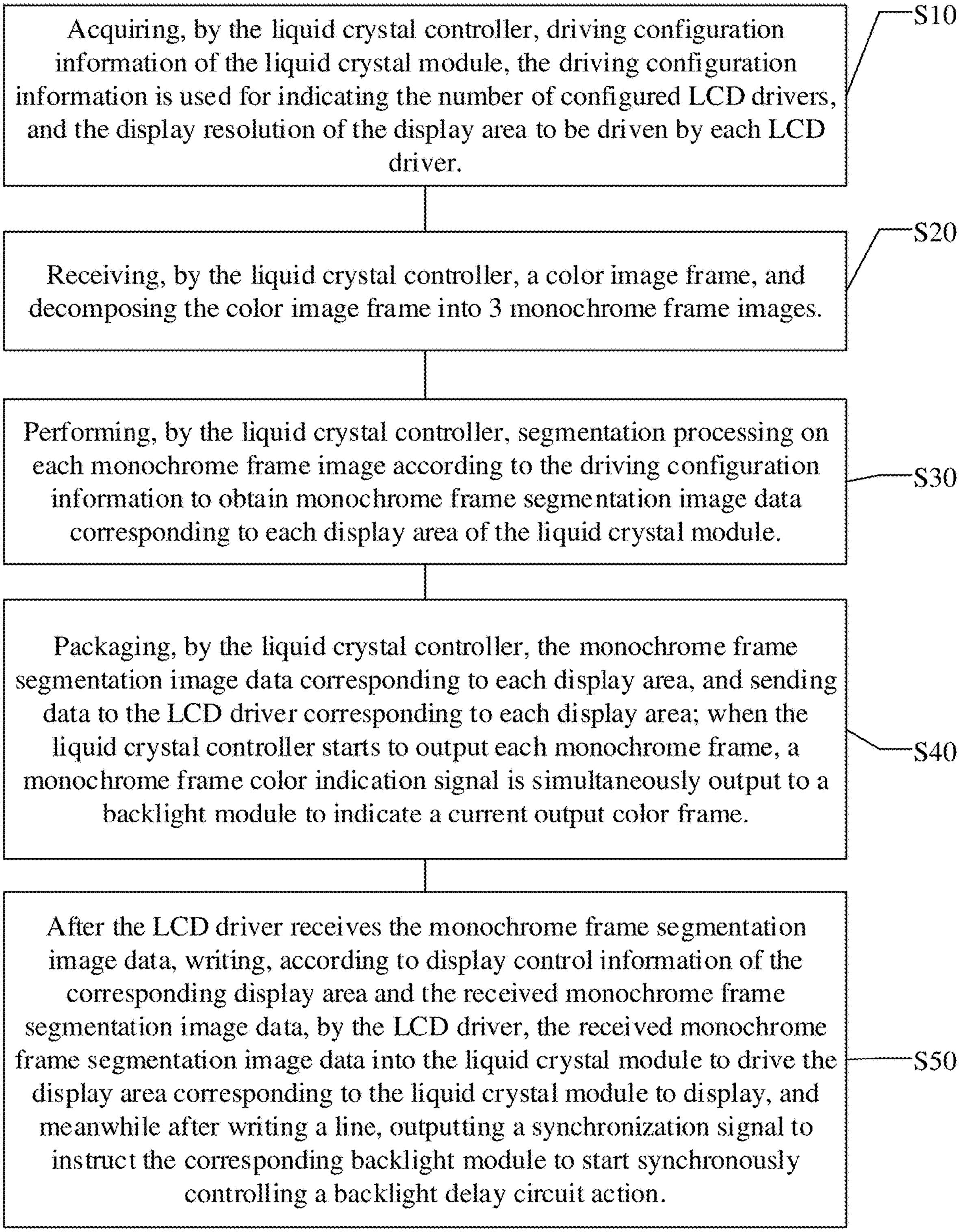
FIG. 2 is a flowchart of a display driving method according to an embodiment of the present application.

In the prior art, the display refresh rate is fixed after the liquid crystal module and the driver are determined and cannot be changed flexibly. In order to improve the display refresh rate, the embodiment of the application provides a new display driving method in combination with the above display system, which can improve the display refresh rate and flexibly configure the display refresh rate. As shown in FIG. 2, in an embodiment, a display driving method is provided, which includes the following steps:

S10: acquiring, by the liquid crystal controller, driving configuration information of the liquid crystal module, the driving configuration information is used for indicating the number of configured LCD drivers, and the display resolution of the display area to be driven by each LCD driver.

The liquid crystal module includes an LCD display module, a liquid crystal and other components. In this embodiment of the application, the number of LCD drivers configured for indicating the display system, and the display resolution of the display area to be driven by each LCD driver would be acquired first, so as to serve as the basis for image segmentation in subsequent area display.

For example, as shown in FIG. 1, the number of LCD drivers configured in the display system may be 3, 4 or other numbers. For example, the number of LCD drivers is 3, and the display resolutions of the display areas to be driven by the 3 LCD drivers are A1, A2 and A3, respectively, which are related to the resolution of the gray image data to be finally displayed. In the embodiment of the present application, the driving configuration may be sent or written to the LCD driver in advance, so that the LCD driver can obtain the driving configuration information.

S20: receiving, by the liquid crystal controller, a color image frame, and decomposing the color image frame into 3 monochrome frame images.

After receiving the color image frame, the drive controller decomposes the color (red, green and blue) image frame into three monochrome frame images. The color image frame input to the liquid crystal controller refers to the complete display image to be displayed in the display module of the liquid crystal module, and the liquid crystal controller can read the color image frame from the main control processor or directly from the video memory, which may be different according to the application scenarios, and will not be described in detail here. The color image frame is then decomposed into image, referred as 3 monochrome frames.

S30: performing, by the liquid crystal controller, segmentation processing on each monochrome frame image according to the driving configuration information to obtain monochrome frame segmentation image data corresponding to each display area of the liquid crystal module.

S40: packaging, by the liquid crystal controller, the monochrome frame segmentation image data corresponding to each display area, and sending data to the LCD driver corresponding to each display area; when the liquid crystal controller starts to output each monochrome frame, a monochrome frame color indication signal is simultaneously output to a backlight module to indicate a current output color frame.

In an embodiment, the step of performing, by the liquid crystal controller, segmentation processing on each monochrome frame image according to the driving configuration information to obtain monochrome frame segmentation image data corresponding to each display area of the liquid crystal module, including: determining, by the liquid crystal controller, the number of the display areas and display resolution according to the driving configuration information; and performing, by the liquid crystal controller, segmentation processing on each monochrome frame image according to the number of the display areas and the display resolution, to obtain monochrome frame segmentation image data corresponding to each display area of the liquid crystal module.

Specifically, the number of LCD drivers corresponds to the number of display areas of the liquid crystal module, or the number of display areas of the liquid crystal module is smaller than the number of LCD drivers, and there is no specific limitation. For example, if the number of LCD drivers is 3, the number of display areas of the liquid crystal module may also be 3, and then each decomposed monochrome frame image is segmented to obtain monochrome frame segmentation image data corresponding to the above 3 display areas, and for the 3 monochrome frame segmentation image data corresponding to the 3 display areas, each display area corresponds to the segmented monochrome frame segmentation image data. For example, if the number of LCD drivers is 3, the number of display areas of the liquid crystal module may be more than 3, which is not specifically limited.

It should be noted that the display area mentioned in the embodiment of the present application may refer to an interval display line or a continuous display line, and is not specifically limited. This content will be described in detail below.

It is worth noting that in the traditional solution, there is no process of image segmentation and packaging and sending each LCD driver. However, the embodiment of this application is provided with multiple LCD drivers, and the required image frames would be segmented according to the divided display areas, which may also be understood as the image division, so as to obtain the image division corresponding to each display area, i.e., 3 monochrome frame segmentation image data corresponding to each display area.

S50: after the LCD driver receives each monochrome frame segmentation image data, the LCD driver writes the received monochrome frame segmentation image data into the liquid crystal module according to the display control information of the corresponding display area and the received monochrome frame segmentation image data, and drives the display area corresponding to the liquid crystal module to display, and meanwhile after writing a line, outputting a synchronization signal to instruct the corresponding backlight module to start synchronously controlling a backlight delay circuit action.

It can be understood that the writing time of each line is basically fixed. For example, the fastest time to write a line is 2.5 μs for the fastest display screen at present. Taking 1080P image as an example, it takes 1080*2.5 μs=2.7 ms to display a 1080P image, i.e., it takes 2.7 ms to write a frame of 1080P image. However, according to the embodiment of the present application, for example, if the display is divided into three display areas, each area has 360 lines, and three display areas are written to the LCD screen at the same time, then a frame only needs a writing time of 360*2.5 μs=0.9 ms. It can be seen that if more LCD drivers are adopted to drive the liquid crystal, a shorter writing time may be obtained. After the display image data of the liquid crystal is written, it starts to flip to the flip time of the corresponding display voltage. For example, from the darkest to the brightest. For a liquid crystal, the flip time is also fixed. Hence, for a frame of image, the writing time plus the full time of liquid crystal flip is the maximum time required for the whole liquid crystal to display a frame of image. The shorter the time, the higher the display refresh rate of the liquid crystal. Therefore, the writing time can be effectively shortened and the improvement can be achieved with the embodiment of the application.

It should be noted that for each LCD driver, display control information for controlling writing is generated according to the sub-block image data that each LCD driver needs to drive and display. The display control information includes certain synchronization information, etc. The process of writing image data by each LCD driver is similar to that of a single LCD driver. Therefore, the process of timing control will not be described here. The difference is that there are differences in display control because multiple LCD drivers are provided, and images are segmented and driven in blocks.

Image data is divided into three corresponding monochrome frames according to each display area and sent to the corresponding LCD driver, so that the LCD driver can divide the image data according to the display control information of the corresponding display area and the received three monochrome frames.

It can be understood that the display process of the display module of the liquid crystal module is driven by the LCD driver, and it is realized by a certain scanning mode, one whole line is displayed at a time, and each line is scanned once in a frame, hence a circuit is needed to control the output voltages on the lines and columns, and this circuit is the LCD driver. In the embodiment of the application, each LCD driver needs to receive the display control information from the liquid crystal controller according to the display area, so as to change the output voltage of the line/column of the pixel corresponding to the display in the corresponding display area. And after receiving the written image data, the liquid crystal controller converts it into the display control signal corresponding to each LCD driver for each LCD driver according to the processing method of the application.

It can be seen that in the display driving method provided by the embodiment of the present application, the color image frames input to the liquid crystal controller are segmented to obtain three sets of monochrome frame segmentation image data corresponding to each display area of the liquid crystal module. Then, according to the three sets of monochrome frame segmentation image data corresponding to each display area of the liquid crystal module, each LCD driver drives the display areas corresponding to the liquid crystal module in parallel according to the received three sets of monochrome frame segmentation image data and the display control information. Compared with the traditional solutions, the display refresh rate can be greatly improved because the image input to the liquid crystal controller is segmented, and a plurality of different LCD drivers are controlled according to the segmentation image, and the display area of the liquid crystal module is driven in parallel to display the segmentation image data. Moreover, as there are a plurality of LCD drivers provided, in the embodiments of the application, each monochrome frame image of the liquid crystal module can be segmented flexibly according to the expected number of sets, so that the number of LCD drivers configured for driving can also be flexibly determined. Thereby, the display refresh rate of the image displayed by the liquid crystal module can be flexibly configured or conveniently altered, which is highly practical.

It should be noted that each LCD driver drives the display area corresponding to the LCD module in parallel according to the received target display configuration information, which can be realized in a variety of ways, two of which are listed in the embodiment of this application, and are introduced respectively below.

Implementation way 1: each display area includes continuous display lines, i.e., each display area includes continuous drive lines, and the number of display areas corresponding to the liquid crystal module matches the number of LCD drivers, each LCD driver is used to drive a display area correspondingly, and the display areas driven by each of the LCD drivers are different.

Figure 3:
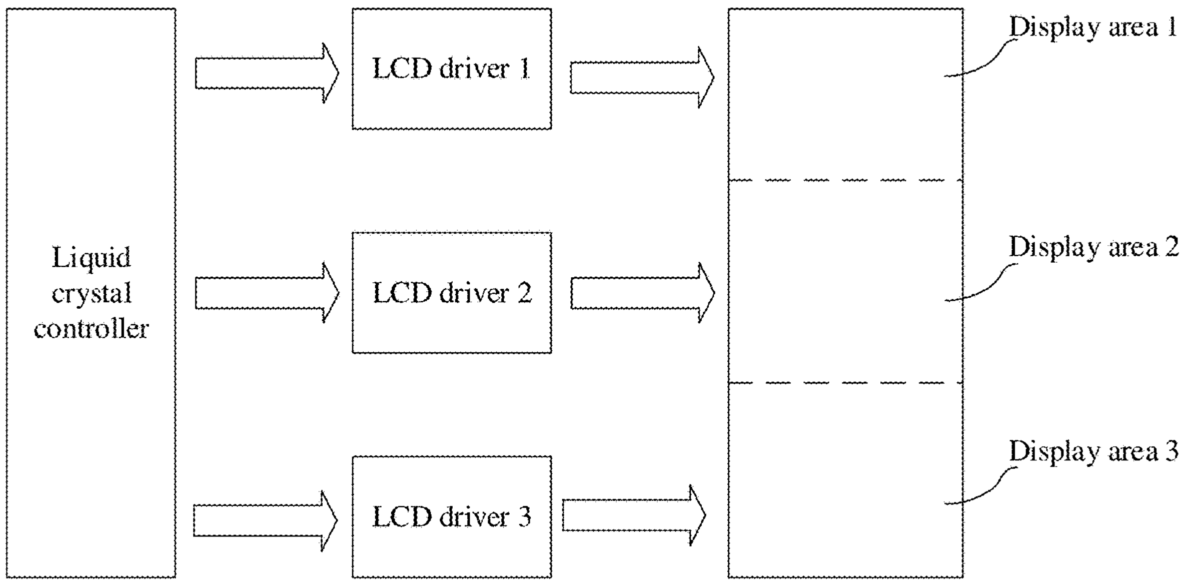
FIG. 3 is a schematic diagram of a driving process of a display driving method according to an embodiment of the present application.

The number of display areas corresponding to the liquid crystal module matches the number of LCD drivers, which means that the number of display areas corresponding to the liquid crystal module is the same as that of the LCD drivers. For the convenience of understanding Implementation way 1, please refer to FIG. 3. In the example of FIG. 3, the number of display areas corresponding to the liquid crystal module is 3, each display area includes continuous display lines, and the number of LCD drivers is also 3. The LCD drivers include LCD driver 1, LCD driver 2 and LCD driver 3, and the display areas of the liquid crystal module include Display area 1, Display area 2 and Display area 3. Display area 1, Display area 2 and Display area 3 all include continuous display lines, and the continuous display lines of three display areas constitute a complete display line. When the liquid crystal controller divides three monochrome frame images into three, the three LCD drivers are used to drive one of the three display areas, i.e., the display areas driven by each of the three LCD drivers are different.

For example, the LCD driver 1 is used to drive the display in Display area 1, the LCD driver 2 is used to drive the display in Display area 2, and the LCD driver 3 is used to drive the display in Display area 3. Then, after the LCD controller divides the three monochrome frame segmentation image data corresponding to the color image frame, the three LCD drivers respectively drive and display the three monochrome frame segmentation image data corresponding to the three display areas.

Figure 4:
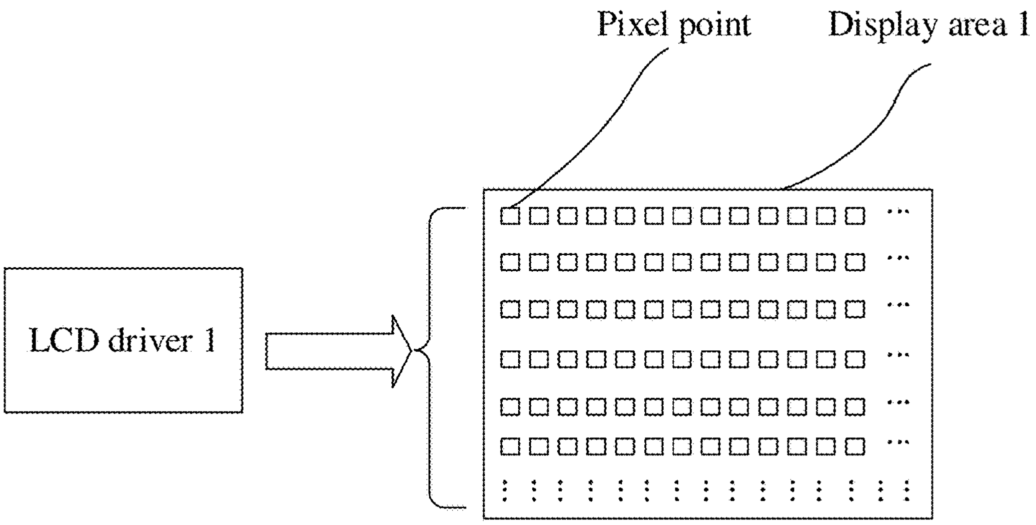
FIG. 4 is a schematic diagram of a driving process of Display Area 1 in the driving process shown in FIG. 3.

More specifically, as shown in FIG. 4, taking LCD driver 1 as an example, when driving Display area 1 to display, the LCD driver 1 takes the segmentation image data corresponding to Display area 1 as the written image data, and controls each pixel in Display area 1 to write corresponding gray-scale image data according to the display control information, so as to drive and display the display area.

In addition, it should be noted that in some embodiments, the number of image lines displayed in each of the three display areas may also be different, and there is no specific limitation. It should be noted that because the writing time of the display area with more lines is longer, it will take more time than the lines with average number, and the refresh rate will be lower than the lines with average number. Therefore, the method of dividing the display area into lines according to the number of LCD drivers would achieve a higher refresh rate. Its application value is higher and it is convenient to configure.

Implementation way 2: the display area includes interval display lines divided according to certain interval. According to a certain line interval, the corresponding driving lines are sequentially allocated to each LCD driver, and each LCD driver is used for driving the allocated driving lines.

Figure 5:
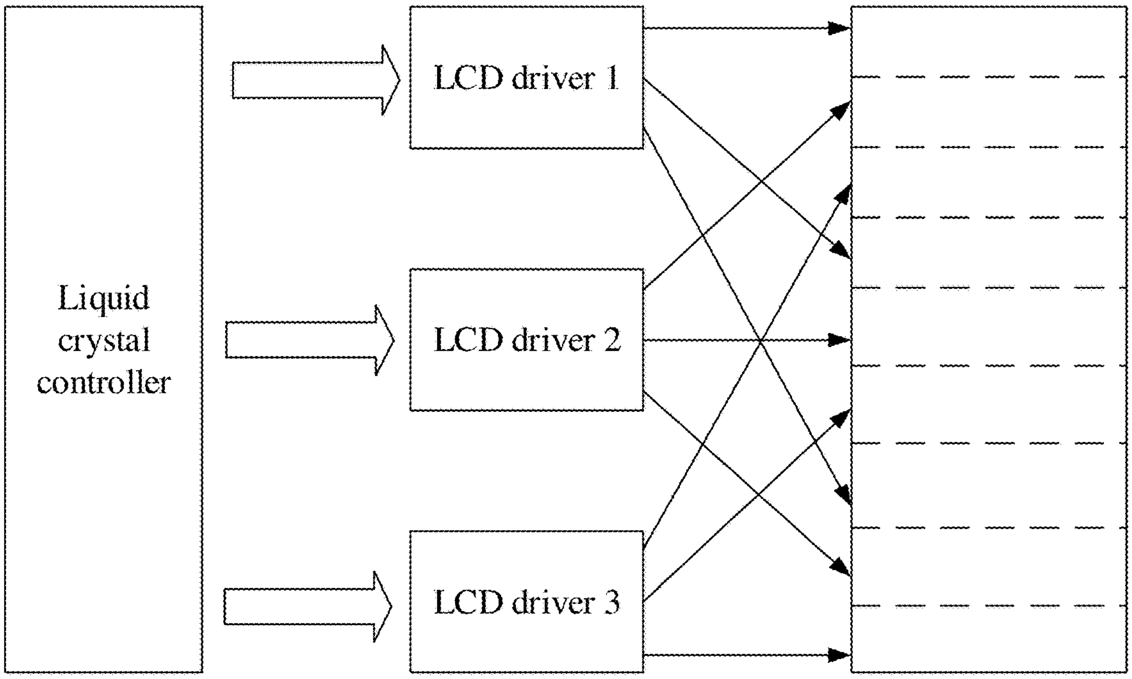
FIG. 5 is a schematic diagram of another driving process of a display driving method according to an embodiment of the present application.

For the understanding of Implementation way 2, please refer to FIG. 5, the liquid crystal modules are divided according to a certain line interval, for example, the line interval may be 3 lines. According to the line interval, each LCD driver is assigned a corresponding driving line (for example, block line 11, block line 12, and block line 13; block line 21, block line 22, block line 23 . . . ). In this uniform way, the number of LCD drivers is also three, and the LCD drivers include LCD driver 1, LCD driver 2 and LCD driver 3. When the gray-scale image data is divided, taking the line interval of 1 as an example, Lines 1, 4, 7 . . . are assigned to LCD driver 1; Lines 2, 5, 8 . . . are assigned to LCD driver 2, and Lines 3, 6, 9 . . . are assigned to LCD driver 3. It should be noted that the above examples are only illustrative. In other embodiments, taking the line interval of 3 as an example, apparently, Lines 1, 2, 3, 10, 11, 12, 21, 22, 23 . . . may also be allocated to LCD driver 1, Lines 4, 5, 6, 13, 14, 15, 24, 25, 26 . . . may be allocated to LCD driver 2, and similarly, Lines 7, 8, 9, 16, 17, 18, 27, 28, 29 . . . may be allocated to LCD driver 4. There is no need to list all.

Figure 6:
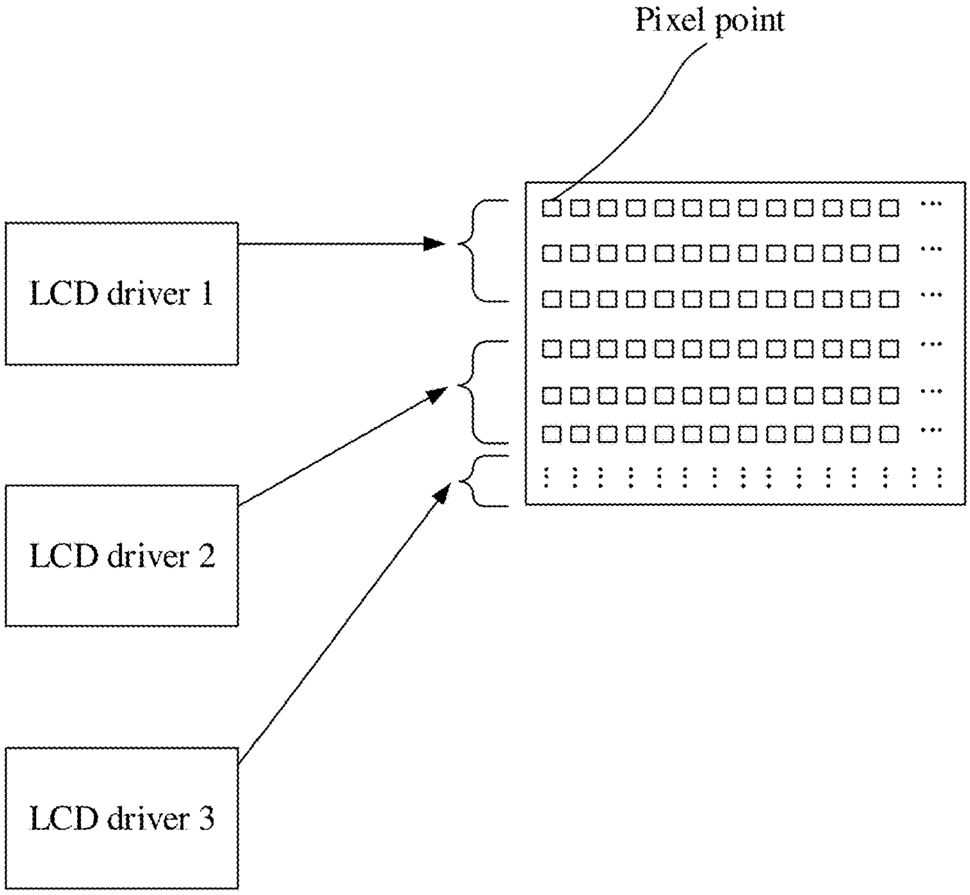
FIG. 6 is a schematic diagram of a driving process of Display Area 1 in the driving process shown in FIG. 5.

More specifically, as shown in FIG. 6, taking the upper display area of the display area as an example, it can be seen that among the three LCD drivers, when driving display, LCD driver 1 controls each line to write the corresponding segmentation image data for each pixel of Lines 1, 2, 3 according to the corresponding segmentation image data. Similarly, when driving display, LCD driver 2 controls each line to write the corresponding segmentation image data for each pixel of Lines 4, 5, 6 according to the segmentation image data. When driving display, LCD driver 3 controls each line to write the corresponding segmentation image data for each pixel of Lines 7, 8, 9 according to the segmentation image data.

It should be noted that FIGS. 5-6 are only for illustration. In other embodiments, multiple LCD drivers may also adopt other cross-drive display methods. For example, LCD driver 1 drives the whole display area of a certain part, while LCD driver 2 and LCD driver 3 perform cross-drive display, and LCD driver 1 does not participate in cross-drive display. It is not limited specifically in this embodiment.

For the LCD drivers, the display control information of the segmentation image data corresponding to the three display areas will be generated according to the cross drive, so that the three LCD drivers can drive and display the corresponding areas of the three display areas.

In the foregoing embodiments, specific embodiments in which a plurality of LCD drivers drive a plurality of display areas of the liquid crystal module are provided, which provides the feasibility of the solution. It should be noted that in Implementation way 1, because one LCD driver drives all areas of a certain display area correspondingly, it is more conducive to the wiring of LCD-driven display and more convenient.

It should be noted that for LCD driver, it is necessary to cooperate with the control of the liquid crystal controller to drive the display areas corresponding to the liquid crystal modules in parallel according to the received target display configuration information. The parallel driving may refer to simultaneous driving or driving in time division according to a certain time interval, and the embodiment of the application is not limited to this, as long as the display refresh rate can be improved without affecting the display effect.

In one embodiment, three monochrome frame images include respective monochrome image data of red, green and blue. In the display system provided in the embodiment of the application, the liquid crystal module can display the gray-scale image data segmentation processing mode according to the embodiment of the application, and display the gray-scale image display effect.

It can be understood that when each LCD driver drives the display area corresponding to the LCD module, it writes each monochrome image data to each pixel point of the corresponding sub-area according to the written image data. Or the process of a red channel data signal (R), a green channel data signal (G) and a blue channel data signal (B) displayed in time division that makes the pixel point to present a corresponding image. Each LCD driver can directly write data of the red channel data signal (R), green channel data signal (G) and blue channel data signal (B) to each pixel when driving the pixel points corresponding to the display area, so that the display screen of the LCD module can display images.

Figure 7:
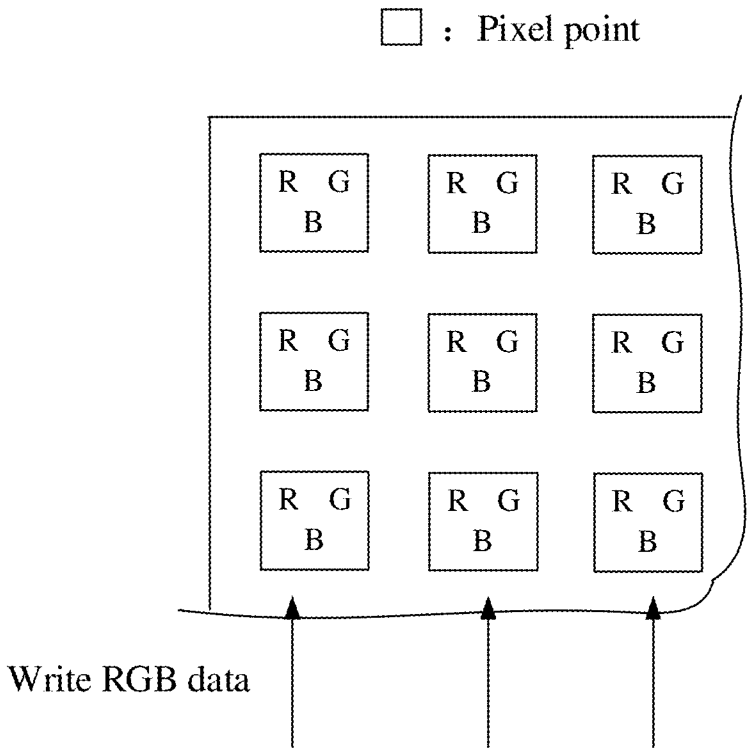
FIG. 7 is a schematic diagram showing a pixel written to gray image data in a display driving method according to an embodiment of the present application.

As shown in FIG. 7, for each pixel, RGB image data (i.e., red channel data signal (R), green channel data signal (G) and blue channel data signal (B)) are generally written to the corresponding pixel position of the corresponding sub-area through a plurality of drive controllers.

Figure 8:
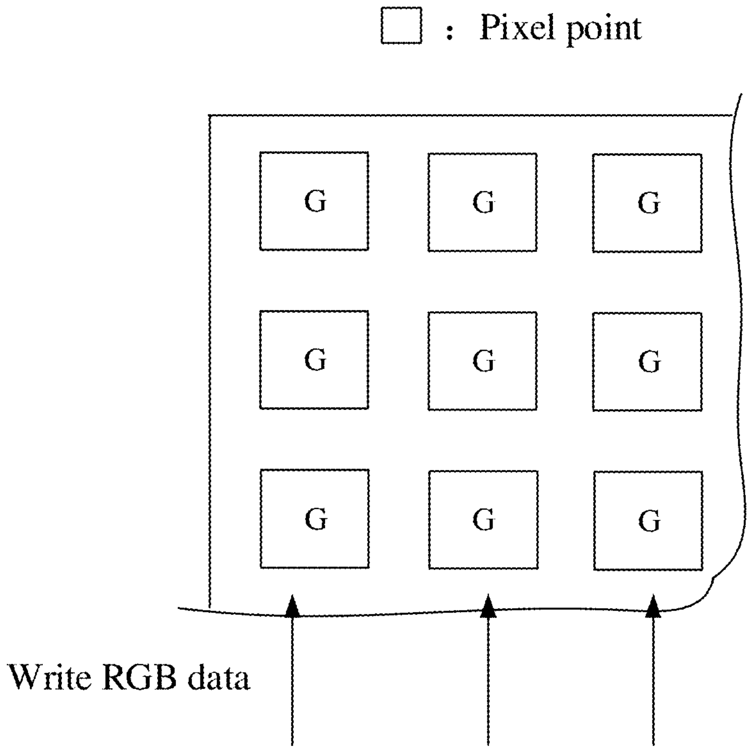
FIG. 8 is a schematic diagram of a display driving method according to an embodiment of the present application, in which a pixel is written to color data for image data.

When driving pixel points, the embodiment of the application has also made a first further optimization, as shown in FIG. 8, i.e., the liquid crystal controller puts the monochrome data of each line into a color data bit of a pixel point, such as the data bit of G channel, and when the LCD driver refreshes the LCD, it refreshes an RGB image data to the pixel point of the same line for display. The liquid crystal itself only connects the line of this color channel (G) to the driver, and the driver drives the other two colors (R). When the display area corresponding to the liquid crystal module is driven, the following methods are adopted: according to the display control signal corresponding to the LCD driver, each pixel point of the display area corresponding to the LCD driver is controlled by the same color channel to give a red channel data signal, a green channel data signal and a blue channel data signal in time division, and the color channel is one of a red channel, a green channel line or a blue channel.

As shown in FIG. 8, a schematic diagram of the writing process of partial pixel points in the display area. In the specific implementation, the LCD driver connects one of the color lines in the monochrome frame segmentation image data to the corresponding pixel points. For example, only the green channel transmits the red channel data signal, the green channel data signal and the blue channel data signal, i.e., the LCD driver only connects the line number of the green channel G to the monochrome point of the LCD for display. FIG. 8 merely shows the green channel as an example. In other embodiments, the red channel R may be used to transmit RGB image data, or the red channel R may be used to transmit RGB image data in time division, which is not specifically limited. In this embodiment, only one color channel is used to input RGB data, which can reduce the use of signal lines of other color channels, simplify circuit complexity and reduce LCD wiring.

Figure 9:
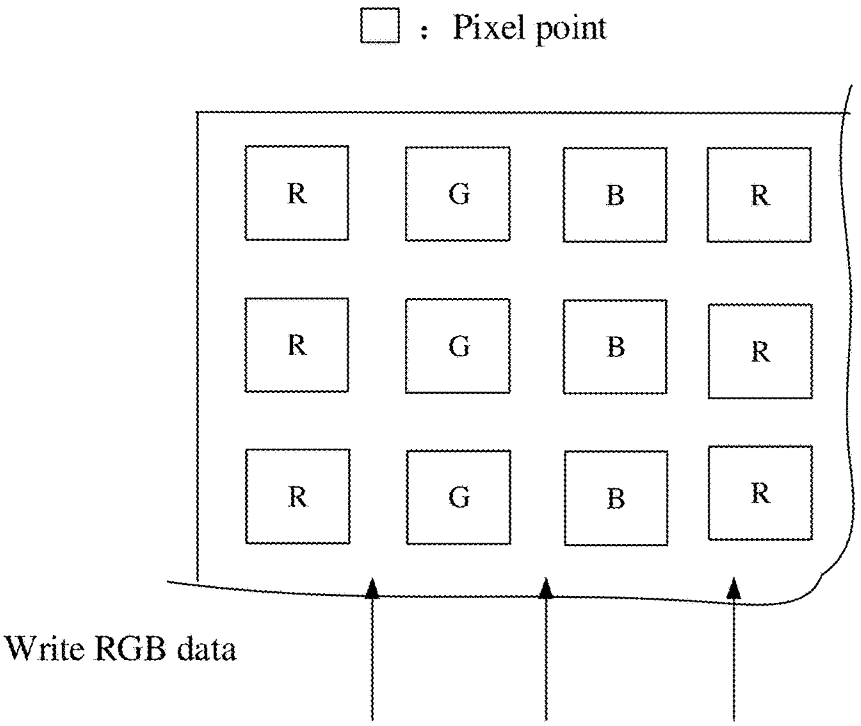
FIG. 9 is a schematic diagram of a display driving method according to another embodiment of the present application, in which a pixel is written to color data for gray image data.

When driving pixel points, a second further optimization may be made. The liquid crystal controller packs data, and in each line signal of image data divided by monochrome frames for the corresponding LCD driver, three consecutive pixel points are regarded as RGB bits in one point of standard color protocol. If the number of points in the current line of the display area is not exactly a multiple of three, the RGB position of the last protocol point may be filled with “0”. That is, when the LCD driver drives the display area corresponding to the liquid crystal module, it is driven in the following ways: the liquid crystal controller encodes the data of three monochrome image points per line of a monochrome frame into RGB image data of one image point, and sends it to the LCD driver to control the pixel points of the display area corresponding to the LCD driver to be output to the liquid crystal module, and between the LCD driver and the liquid crystal module, the lines of three color points of each pixel point are connected to three monochrome points adjacent to the liquid crystal. That is, the liquid crystal module routes three groups of RGB control lines of the same image of the driving controller into three monochrome pixel points, as shown in FIG. 9, which is a schematic diagram of writing partial pixel points in the display area. In the specific implementation, only one color channel data signal is written for each pixel point. As shown in FIG. 9, for each line of pixel points, in the order of R\G\B \R\G\BR\G\B . . . R\G\B, only one color channel data is written for each pixel point, and only one third of the original frame data needs to be sent, and the pixel points of the screen are wired in a manner that one color corresponds to three monochrome points. In this way, while realizing the display, it can also reduce the amount of data transmitted and improve the system capability.

It should be noted that FIG. 9 is only an example here, and other color arrangement sequences are also possible, so there is no limitation here, for example, G\R\B \G\R\BG\R\B . . . G\R\B, etc., the details are not limited. In the embodiment of the application, compared with the general color data solution in which one pixel is written into the corresponding color channel in time division, only the color data of one image is written into every three pixel points in the embodiment of the application. That is, the color data of one color channel written into each frame pixel point in time division is only ⅓ of the original pixel point, which can greatly reduce the data writing amount, improve the overall performance of the system, take less transmission time, and be more effective for improving the refresh rate, and has higher practicability.

It can be understood that the liquid crystal module is a display module with liquid crystal as the basic material. When driving the display, the rotation direction of liquid crystal molecules is controlled by controlling the voltages at both ends of the liquid crystal molecules through the LCD driver, and then the polarized light projection of each pixel can be controlled to achieve the purpose of display. That is, the LCD driver drives each pixel point, including data writing time and deflection time of liquid crystal molecules. The inventor further found that when driving monochromatic color image data according to the above two optimization methods, due to monochromatic display in time division, each monochromatic color appears in time division, and in the case of gray-scale display, it is impossible to use white backlight for long-term display like a color screen, and each monochromatic color would also appear in time division, but due to the limitation of the time taken by each monochromatic color (writing time and flipping time), in some periods, the corresponding backlight would not appear, because it would lead to display color disorder. In this embodiment of the application, when driving the gray-scale display based on the above-mentioned method, when displaying the monochromatic light in time division, the time sequence of the backlight monochromatic lamp would be correspondingly controlled when driving the gray-scale screen, so that the backlight would appear at an appropriate time. When the monochrome screen outputs R, G, B and the corresponding backlight in time division, the control solution of dividing multiple LCD drivers is used to control the monochrome backlight timing to improve the display effect.

Figure 11:
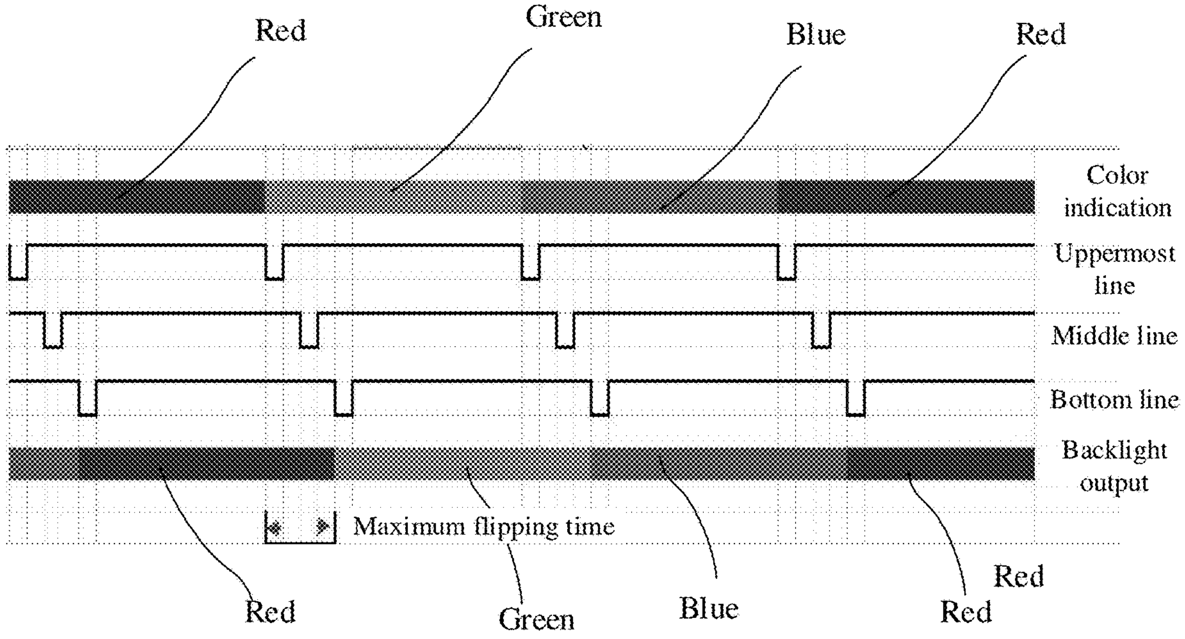
FIG. 11 is a timing diagram for controlling the timing of backlight monochromatic lights to cooperate with high refresh rate display.

As shown in FIG. 11, a schematic diagram of timing control for controlling backlight timing, taking sub-area display as an example. In FIG. 11, for red channel data signal (R) frame, green channel data signal (G) frame and blue channel data signal (B) frame, when controlling the backlight time of each monochrome image data, “Top” means the first line of a driver, Low level indicates that writing is in progress, Low to High indicates the writing completion time. “Middle” refers to the middle line, Low level indicates that writing is in progress, Low to High indicates the writing completion time. “Bottom” refers to the bottom line, Low level indicates that writing is in progress, Low to High indicates the writing completion time. The top indicates the corresponding color frame, and the bottom represents the backlight control turn-on time after the maximum flipping time of the liquid crystal is delayed after the uppermost line is written. The backlight control timing of each area is shown in FIG. 11.

It can be seen that when the embodiment of the application drives the display, the time sequence of the backlight monochromatic lamp is correspondingly controlled, so that the backlight of monochromatic light appears at an appropriate time. As shown in FIG. 11, the display system also includes a backlight control module. After each LCD driver receives three monochrome frame segmentation image data of the corresponding display area, when the first line of each frame is displayed, the LCD driver gives a synchronization signal that the corresponding monochrome lamp is ready to switch, and the backlight control module delays the time corresponding to the maximum flipping of the liquid crystal to switch to the corresponding single-lamp backlight according to the synchronization signal sent by the LCD drivers of each display area. Finally, the LCD controller completes three monochrome frames to the LCD driver to complete the driving operation, and the backlight driving module completes the switching of the backlight, which is a complete display cycle of a frame of image data.

It can be understood that when driving each line, there is a writing time of image data in each line. For example, the writing time of each line is 2.5p, and the maximum liquid crystal switching time corresponding to this display line is 2.5 ms, so for a certain display area, the total writing time of this display area is =(2.5 μs)*the number of display area lines. Although it can be assumed that the display lines in different display areas are different. However, the liquid crystal controller synchronously transmits data to each LCD driver, and the difference of the first line writing time of each LCD driver can be ignored. The delay of writing data in the first line of the display area to the liquid crystal flipping time of this line may be different, but the first line writing and the delay to the maximum liquid crystal flipping time are the same. Therefore, it is necessary to delay turning on the monochrome frame color backlight until the first line of the next monochrome frame is written and wait for the maximum liquid crystal flipping time to ensure that the color is normal during this time. Furthermore, according to the writing time of a complete frame and the liquid crystal flipping time, the backlight lighting time sequence of the whole monochromatic light is controlled. For example, when the red channel data signal (R) frame is time-divided, the red backlight is displayed, and when the blue backlight is displayed in time division, it is delayed to display the blue backlight, thus each monochromatic color also needs to appear in time division. Hence, the problem of display color disorder would not occur, and the refresh rate is also improved, i.e., the monochrome screen is output in time division.

In an embodiment, a display driving device is provided, which includes:

an acquisition module, configured to acquire driving configuration information of a liquid crystal module, and receive a color image frame, the driving configuration information is used for indicating the number of configured LCD drivers;

a processing module, configured to decompose the color image frame into 3 monochrome frame images; and perform segmentation processing on each monochrome frame image according to the driving configuration information to obtain monochrome frame segmentation image data corresponding to each display area of the liquid crystal module; when each monochrome frame is output, a monochrome frame color indication signal is simultaneously output to a backlight module to indicate a current output color frame;

package the monochrome frame segmentation image data corresponding to each display area, and send data to the LCD driver corresponding to each display area, so that after the LCD driver receives each monochrome frame segmentation image data; according to display control information of the corresponding display area and the received monochrome frame segmentation image data, the LCD driver writes the received monochrome frame segmentation image data into the liquid crystal module to drive the display area corresponding to the liquid crystal module to display, and meanwhile after writing a line, output a synchronization signal to instruct the corresponding backlight module to start synchronously controlling a backlight delay circuit action; and the liquid crystal controller packages data, in each line of signal of the monochrome frame segmentation image data of the corresponding LCD driver, 3 consecutive pixel points are taken as one RGB protocol point in a standard color protocol; if the number of pixel points of a current line in the display area is not a multiple of 3, then it is filled with "0", until it is enough to form a full protocol point.

For the specific description of the display driving device, please refer to the description of the display driving method above, and will not repeat it here. Each module in the above display driving device may be realized in whole or in part by software, hardware and their combinations. The above modules may be integrated with or separate from the controller in the form of hardware, and may also be stored in the memory of the controller in the form of software, so that the processor can call and execute the operations corresponding to the above modules.

It can be seen that in the display driving device provided by the embodiment of the application, compared with the traditional solution, the display refresh rate may be greatly improved because the display image of the liquid crystal module is segmented, and a plurality of different LCD drivers are controlled according to the segmented image, and the display area of the liquid crystal module is driven in parallel to display the segmented image data. Moreover, as there are a plurality of LCD drivers provided, in the embodiments of the application, the display of the liquid crystal module may be flexibly segmented and packaged according to the expected number of sets, so that the number of LCD drivers configured for driving can also be flexibly determined. Thereby, the display refresh rate of the image displayed by the liquid crystal module can be flexibly configured or conveniently altered, which is highly practical.

In an embodiment, a liquid crystal controller is provided, which may be a Field Programmable Gate Array (FPGA), and the liquid crystal controller is used to realize the functions or steps of the liquid crystal controller of the above embodiment.

For the specific description of the liquid crystal controller, please refer to the description of the display driving method above, and will not repeat it here. Each module in the above-mentioned liquid crystal controller may be realized in whole or in part by software, hardware and their combinations. The above modules may be integrated with or separate from the controller in the form of hardware, and may also be stored in the memory of the controller in the form of software, so that the processor can call and execute the operations corresponding to the above modules.

In an embodiment, a system-on-chip or integrated circuit module is provided, and the system-on-chip or integrated circuit module includes the liquid crystal controller provided by the embodiment of the application.

In one embodiment, a computer-readable storage medium is provided, on which a computer program is stored, and when the computer program is executed by a controller, a display driving method provided in the above embodiment is realized.

For more details about the solution implemented by the liquid crystal controller and the computer-readable storage medium, please refer to the aforementioned method embodiment, and the description will not be repeated here.

In some embodiments, the embodiment of the application also provides a projection device, which includes the display system provided by the embodiment of the application.

In addition, the terms "first", "second", "third" and "fourth" in the description of the foregoing embodiments are used to distinguish similar objects, and are not used to define a specific order or sequence.

A person of ordinary skill in the art can understand that all or part of the processes in the method of the foregoing embodiments can be implemented by instructing related hardware through a computer program, which can be stored in a nonvolatile computer readable storage medium, and the computer program can include the steps of the above embodiments when executed. Wherein, any reference to memory, storage, database or other medium used in the embodiments provided in this application may include non-volatile and/or volatile memory. The nonvolatile memory may include read-only memory (ROM), programmable ROM (PROM), electrically programmable ROM (EPROM), electrically erasable programmable ROM (EEPROM), or flash memory. The volatile memory may include random access memory (RAM) or external cache memory. As an illustration and not a limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus, (Rambus), direct RAM (RDRAM), direct memory bus dynamic RAM (DRDRAM), and memory bus dynamic RAM (RDRAM), etc.

A person of ordinary skill in the art can clearly understand that, for the convenience and conciseness of description, the division of the above functional units and modules are only used as examples. In practical applications, the above functions may be implemented by different functional units and modules as needed. That is, the internal structure of the device may be divided into different functional units or modules to complete all or part of the functions described above.

The above embodiments are only used to illustrate the technical solutions of the present application, but not to limit it. Although the present application has been described in detail with reference to the foregoing embodiments, those skilled in the art would understand that it is possible to modify the technical solutions described in the foregoing embodiments, or to replace some technical features with equivalents. However, these modifications or substitutions do not make the essence of the corresponding technical solutions deviate from the spirit and scope of the technical solutions of various embodiments of the present application, and shall be included in the protection scope of the present application. Further, unless otherwise required by context, singular terms shall include pluralities and plural terms shall include the singular.

The invention claimed is:

1. A display driving method, used for a display system, the display system comprises a liquid crystal controller, a liquid crystal module and a plurality of LCD drivers, wherein the display driving method comprises:

acquiring, by the liquid crystal controller, driving configuration information of the liquid crystal module, the driving configuration information is used for indicating the number of configured LCD drivers;

receiving, by the liquid crystal controller, a color image frame, and decomposing the color image frame into 3 monochrome frame images;

performing, by the liquid crystal controller, segmentation processing on each monochrome frame image according to the driving configuration information to obtain monochrome frame segmentation image data corresponding to each display area of the liquid crystal module;

packaging, by the liquid crystal controller, the monochrome frame segmentation image data corresponding to each display area, and sending data to the LCD driver corresponding to each display area; when the liquid crystal controller starts to output each monochrome frame, a monochrome frame color indication signal is simultaneously output to a backlight module to indicate a current output color frame;

after the LCD driver receives the monochrome frame segmentation image data, writing, according to display control information of the corresponding display area and the received monochrome frame segmentation image data, by the LCD driver, the received monochrome frame segmentation image data into the liquid crystal module to drive the display area corresponding to the liquid crystal module to display, and meanwhile after writing a line, outputting a synchronization signal to instruct the corresponding backlight module to start synchronously controlling a backlight delay circuit action; and packaging, by the liquid crystal controller, data; in each line of signal of the monochrome frame segmentation image data of the corresponding LCD driver, 3 consecutive pixel points are taken as one RGB protocol point in a standard color protocol; if the number of pixel points of a current line in the display area is not a multiple of 3, then it is filled with "0", until it is enough to form a full protocol point; and connecting, by the LCD driver, circuit of a pixel point with 3 colors to three adjacent monochrome points of the liquid crystal module.

2. The display driving method of claim 1, wherein the number of the display areas corresponding to the liquid crystal module matches the number of the LCD drivers, and each of the LCD drivers is used to drive one of the display areas correspondingly, and the display areas driven by the LCD drivers are different.

3. The display driving method of claim 1, comprising: sequentially allocating, by the liquid crystal controller, a corresponding driving line as display area for each of the LCD drivers at certain line intervals, and each LCD driver is used for driving the allocated driving line.

4. The display driving method of claim 1, comprising: decomposing, by the LCD driver, one pixel point with 3 colors in the monochrome frame segmentation image data, and connecting them to three adjacent monochrome points in the same line.

5. The display driving method of claim 1, wherein the step of performing, by the liquid crystal controller, segmentation processing on each monochrome frame image according to the driving configuration information to obtain monochrome frame segmentation image data corresponding to each display area of the liquid crystal module, comprising:

determining, by the liquid crystal controller, the number of the display areas and display resolution according to the driving configuration information; and performing, by the liquid crystal controller, segmentation processing on each monochrome frame image according to the number of the display areas and the display resolution, to obtain monochrome frame segmentation image data corresponding to each display area of the liquid crystal module.

6. A display driving device, comprising:

an acquisition module, configured to acquire driving configuration information of a liquid crystal module, and receive a color image frame, the driving configuration information is used for indicating the number of configured LCD drivers;

a processing module, configured to decompose the color image frame into 3 monochrome frame images; and perform segmentation processing on each monochrome frame image according to the driving configuration information to obtain monochrome frame segmentation image data corresponding to each display area of the liquid crystal module; when each monochrome frame is output, a monochrome frame color indication signal is simultaneously output to a backlight module to indicate a current output color frame;

package the monochrome frame segmentation image data corresponding to each display area, and send data to the LCD driver corresponding to each display area, so that after the LCD driver receives each monochrome frame segmentation image data; according to display control information of the corresponding display area and the received monochrome frame segmentation image data, the LCD driver writes the received monochrome frame segmentation image data into the liquid crystal module to drive the display area corresponding to the liquid crystal module to display, and meanwhile after writing a line, output a synchronization signal to instruct the corresponding backlight module to start synchronously controlling a backlight delay circuit action; and the display driving device is further configured to: package data; in each line of signal of the monochrome frame segmentation image data of the corresponding LCD driver, 3 consecutive pixel points are taken as one RGB protocol point in a standard color protocol; if the number of pixel points of a current line in the display area is not a multiple of 3, then it is filled with "0", until it is enough to form a full protocol point.

7. A liquid crystal controller, used for:

acquiring driving configuration information of the liquid crystal module, the driving configuration information is used for indicating the number of configured LCD drivers;

receiving a color image frame and decomposing the color image frame into three monochrome frame images;

performing segmentation processing on each monochrome frame image according to the driving configuration information to obtain monochrome frame segmentation image data corresponding to each display area of the liquid crystal module;

when the liquid crystal controller starts to output each monochrome frame, a monochrome frame color indication signal is simultaneously output to a backlight module to indicate a current output color frame; packaging the monochrome frame segmentation image data corresponding to each display area, and sending data to the LCD driver corresponding to each display area, so that after the LCD driver receives each monochrome frame segmentation image data; according to display control information of the corresponding display area and the received monochrome frame segmentation image data, the LCD driver writes the received monochrome frame segmentation image data into the liquid crystal module to drive the display area corresponding to the liquid crystal module to display, and meanwhile after writing a line, outputting a synchronization signal to instruct the corresponding backlight module to start synchronously controlling a backlight delay circuit action; and packaging data; in each line of signal of the monochrome frame segmentation image data of the corresponding LCD driver, 3 consecutive pixel points are taken as one RGB protocol point in a standard color protocol; if the number of pixel points of a current line in the display area is not a multiple of 3, then it is filled with "0", until it is enough to form a full protocol point.

8. A display system, comprising a liquid crystal controller, a liquid crystal module and a plurality of LCD drivers, wherein the liquid crystal controller is connected with the plurality of LCD drivers, each of the LCD drivers is connected with the liquid crystal module, and the liquid crystal controller is used for realizing the display driving method of claim 1.

9. A projection device, comprising the display system of claim 8.

* * * * *